United States Patent
Hayashi et al.

(10) Patent No.: US 9,906,015 B2
(45) Date of Patent: Feb. 27, 2018

(54) BATTERY PROTECTION SYSTEM WITH REFERENCE VOLTAGE CONTROL SYSTEM

(71) Applicant: SEMICONDUCTOR COMPONENTS INDUSTRIES, LLC, Phoenix, AZ (US)

(72) Inventors: Yasuaki Hayashi, Oura-gun (JP); Keiji Amemiya, Fukaya (JP); Mutsuki Niki, Saitama (JP); Hiroshi Saito, Ota (JP)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 231 days.

(21) Appl. No.: 14/814,305

(22) Filed: Jul. 30, 2015

(65) Prior Publication Data

US 2017/0033547 A1    Feb. 2, 2017

(51) Int. Cl.
*H02H 3/08* (2006.01)
*H02H 7/18* (2006.01)
*H02H 3/087* (2006.01)

(52) U.S. Cl.
CPC .............. *H02H 7/18* (2013.01); *H02H 3/087* (2013.01)

(58) Field of Classification Search
CPC .............. H02H 3/18; H02H 7/18; H02H 3/087
See application file for complete search history.

(56) References Cited

U.S. PATENT DOCUMENTS

| | | | | | |
|---|---|---|---|---|---|
| 5,561,362 | A | * | 10/1996 | Kawamura | G01R 31/3648 320/134 |
| 5,838,076 | A | * | 11/1998 | Zarrabian | H03K 17/693 307/115 |
| 8,896,268 | B2 | | 11/2014 | Sakurai et al. | |
| 2004/0119494 | A1 | * | 6/2004 | Hotchkiss | G11C 5/147 326/16 |

FOREIGN PATENT DOCUMENTS

| | | |
|---|---|---|
| CN | 102064585 A | 5/2011 |
| CN | 102288810 A | 12/2011 |
| JP | 2001339869 A | 12/2001 |
| JP | 2008192959 A | 8/2008 |
| JP | 2009131020 A | 6/2009 |
| JP | 2009283507 A | 12/2009 |

OTHER PUBLICATIONS

Chuang, Hung-Ming et al. "Temperature-Dependent Characteristics of Polysilicon and Diffused Resistors," Electron Devices, IEEE Transactions on, vol. 50, No. 5, pp. 1413, 1415, May 2003.
Brokaw, A. Paul "A Simple Three-Terminal IC Bandgap Reference," IEEE Journal of Solid-State Circuits, vol. SC-9, No. 6, Dec. 1974.

* cited by examiner

*Primary Examiner* — Zeev V Kitov
(74) *Attorney, Agent, or Firm* — IPTechLaw

(57) ABSTRACT

A programmable battery protection system. Implementations may include: a battery and a battery protection integrated circuit (IC) coupled with the battery that includes a reference voltage circuit, a variable resistor circuit coupled with the reference voltage circuit, and only two field effect (Continued)

transistors (FETs) coupled with the overcurrent detection circuit and with the battery. The reference voltage circuit and the variable resistor circuit may be configured to cause a current sense signal of the system to vary substantially linearly with changes in a supply voltage of the system.

20 Claims, 7 Drawing Sheets

BATTERY PROTECTION SYSTEM WITH REFERENCE VOLTAGE CONTROL SYSTEM

BACKGROUND

1. Technical Field

Aspects of this document relate generally to battery systems, such as battery packs for portable electronic devices.

2. Background Art

Battery systems have been devised to allow electronic devices to operate independent of power from a main power supply. Often, these take the form of a battery pack that contains control circuitry for the battery and which includes a set of leads which electrically couple the battery back to the electronic device. Examples of conventional systems and devices may be found in Japan Patent Application Publication No. P2008-192959A to Masanori Kobayashi, entitled "Semiconductor Integrated Circuit," filed Feb. 7, 2007 and published Aug. 21, 2008; Japanese Patent Application Publication No. P2009-131020A to Masatoshi Sugimoto, entitled "Over-Current Protecting Circuit and Battery Pack," filed Nov. 22, 2007 and published Jun. 11, 2009; and Japanese Patent Application Publication No. P2009-283507A to Yamaguchi et al. entitled "Voltage Setting Circuit, Method for Setting Voltage, Secondary Battery Protecting Circuit, and Semiconductor Integrated Circuit Device," filed May 19, 2008 and published Dec. 3, 2009; the disclosures of each of which are hereby incorporated entirely herein by reference.

SUMMARY

Implementations of programmable battery protection systems may include: a battery and a battery protection integrated circuit (IC) coupled with the battery that includes a reference voltage circuit, a variable resistor circuit coupled with the reference voltage circuit, and only two field effect transistors (FETs) coupled with the overcurrent detection circuit and with the battery. The reference voltage circuit and the variable resistor circuit may be configured to cause a current sense signal of the system to vary substantially linearly with changes in a supply voltage of the system.

Implementations of programmable battery protection systems may include one, all, or any of the following:

The reference voltage circuit and variable resistor circuit may be configured to cause an overcurrent signal of the system to be substantially invariant to changes in a supply voltage of the system.

The reference voltage circuit may include a supply voltage detector circuit, a bandgap buffer circuit, and an amplifier operatively coupled together.

The variable resistor circuit may include an array of fuses coupled with one or more sets of a plurality of switching components coupled in parallel with one or more sets of a plurality of resistors wherein the states of the array of fuses may be configured to open or close corresponding switching components of the one or more sets of the plurality of switching components, permitting one or more summed resistances generated by the one or more sets of the plurality of resistors to be changed.

The overcurrent detector circuit may be configured to use a reference voltage generated by the reference voltage circuit to evaluate whether a discharge overcurrent condition or a charging overcurrent condition exist and to, in response to detecting the discharge overcurrent current condition or the charging overcurrent condition, disconnect the only two FETs from the battery.

The only two FETs and the battery protection IC may be included in the same semiconductor package.

The states of the array of fuses may be configured to be set using a trimming signal generated during an initial testing of the on resistance of the only two FETs.

The array of fuses may include polyfuses.

The states of the array of fuses may be configured to be set using a laser trimming signal based on a specified on resistance of the only two FETs.

The overcurrent detector circuit may be configured to use a reference voltage generated by the reference voltage circuit and the one or more summed resistances to evaluate whether a discharge overcurrent condition or a charging overcurrent condition exist and to, in response to detecting the discharge overcurrent condition and the charging overcurrent condition, disconnect the only two FETs from the battery.

The battery protection IC may further include a temperature variation correction circuit including a diffused resistor coupled to a constant current source and the amplifier. The diffused resistor may be configured to change the reference voltage output from the amplifier as a resistance of the diffused resistor changes as a function of the temperature of the diffused resistor.

The temperature variation correction circuit may be configured to cause the current sense signal of the system to vary substantially linearly with changes in temperature of the diffused resistor.

Implementations of a battery protection IC for a battery protection system may include a reference voltage circuit including a supply voltage detector circuit, a bandgap buffer circuit, and an amplifier where the reference voltage circuit may be configured to supply a reference voltage that is a function of a supply voltage. A variable resistor circuit may be included and may be coupled with the reference voltage circuit. The variable resistor circuit may include an array of fuses coupled with one or more sets of a plurality of switching components coupled in parallel with one or more set of a plurality of resistors. The states of the array of fuses may be configured to open or close corresponding switching components of the one or more sets of the plurality of switching components, permitting one or more summed resistance generated by the one or more sets of the plurality of resistors to be changed. An overcurrent detection circuit may be coupled with the reference voltage circuit and may be configured to use the reference voltage generated by the reference voltage circuit and the one or more summed resistances to evaluate whether a discharge overcurrent condition or a charging overcurrent condition exist and to, in response to detecting the discharge overcurrent condition or the charging overcurrent condition, disconnect a battery from a load or a charger.

Implementations of a battery protection IC may include one, all, or any of the following:

A temperature variation correction circuit may be included that may include a diffused resistor coupled to a constant current source and the amplifier where the diffused resistor may be configured to change the reference voltage output from the amplifier as a resistance of the diffused resistor changes as a function of the temperature of the diffused resistor.

Implementations of programmable battery protection systems and battery protection ICs may utilize implementations of a method of providing a reference voltage to an overcurrent detection circuit of a battery protection IC. The method may include substantially linearizing a response of a current sense signal of a battery to changes in a supply voltage of the battery by using a plurality of states stored in an array of fuses to set a summed resistance of a plurality of resistors coupled to a plurality of switching components coupled with the array of fuses. The method may also include, using the summed resistance and a supply voltage detector comparator, generating a current by converting variation in the supply voltage into a current and, using the current and a bandgap buffer circuit and an amplifier, generating a reference voltage for use by an overcurrent detector circuit.

Implementations of a method of providing a reference voltage may include one, all, or any of the following:

The current may increase when the supply voltage decrease and the current may decrease when the supply voltage increases.

The method may further include using the overcurrent detector circuit and the reference voltage to evaluate whether a discharge overcurrent condition and a charging overcurrent condition exist and to, in response to detecting the discharge overcurrent condition or the charging overcurrent condition, disconnect the battery from a load or a charger.

The method may further include using a temperature variation correction circuit to substantially linearize the response of the current sense signal of the battery to changes in temperature.

The method may further include where the temperature variation correction circuit may include a diffused resistor coupled to a constant current source and the amplifier. The method may also include changing the reference voltage output from the amplifier as a resistance of the diffused resistor changes where the resistance of the diffused resistor is a function of the temperature of the diffused resistor.

The reference voltage may rise as the temperature rises as a function of the impedance of the diffused resistor.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended battery protection systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such, battery protection systems and implementing components and methods, consistent with the intended operation and methods.

Figure 1:
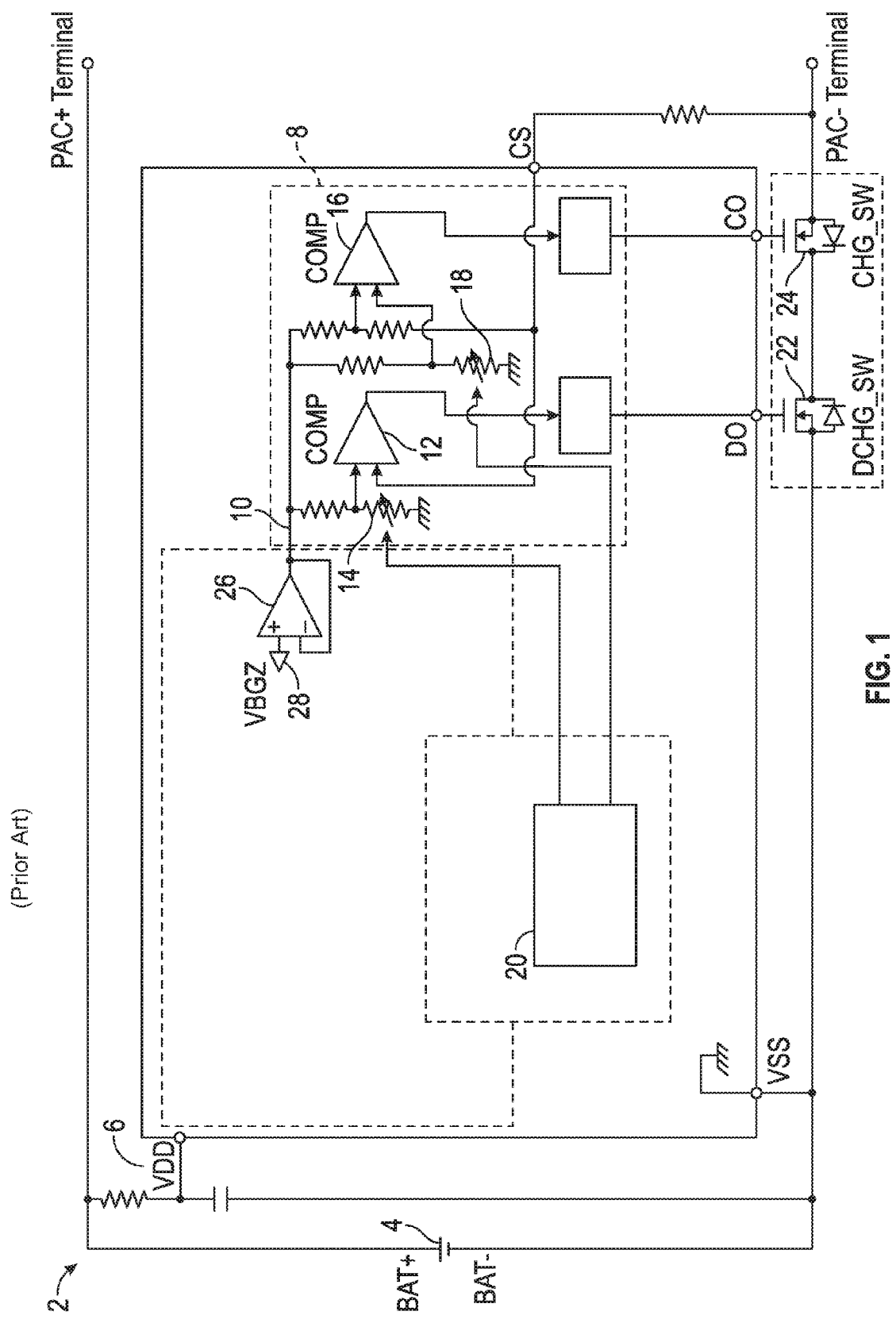
FIG. 1 is a circuit diagram of an first implementation of a battery pack system.

Referring to FIG. 1, an implementation of a conventional battery pack system 2 is illustrated. As illustrated, the system 2 includes a battery 4 which generates a supply voltage 6 (VDD, also VCC herein). An overcurrent detector circuit 8 is included which uses a reference voltage (threshold voltage) 10 as an input to a discharge overcurrent detector that includes comparator 12 and variable resistance 14 which together work to detect a discharge overcurrent condition of the battery 4. A charging overcurrent detector is also included that has comparator 16 and variable resistance 18 that are used to detect a charging overcurrent condition of the battery. The resistance of variable resistances 14, 18 is set through coupling them with the output of a set of conventional laser trimmed fuses 20, whose values are set during manufacturing of the fuses 20 based on an on resistance of field effect transistors (FETs) 22, 24 that is the manufactured specified value. The reference voltage 10 is generated using a comparator 26 that receives as its input value, a band gap reference voltage 28. This band gap reference voltage 28 is based on the theoretical band gap of silicon, and may be generated using a wide variety of conventional circuits. An example of circuits capable of creating the band gap reference voltage 28 are disclosed in the paper by A. Paul Brokaw, entitled "A Simple Three-Terminal IC Bandgap Reference," IEEE Journal of Solid-State Circuits, V. SC-9, No. 6, 388-393 (1974), the disclosure of which is hereby incorporated entirely herein by reference.

Figure 3A:
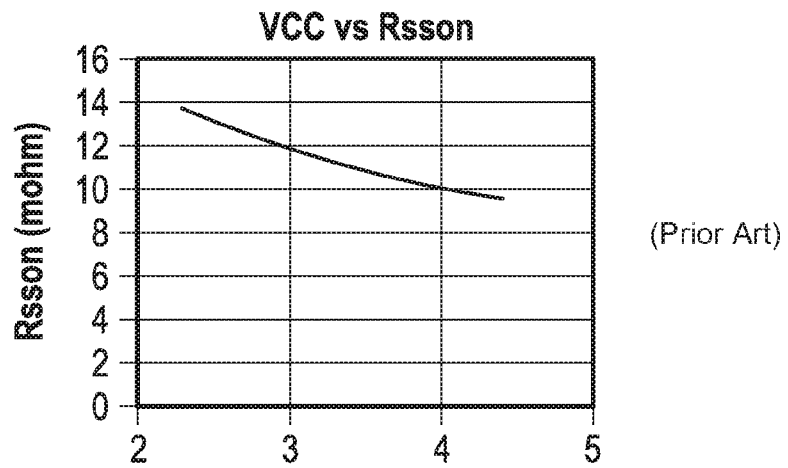
FIGS. 3A-C are diagrams of supply voltage versus on resistance of a field effect transistor (FET), supply voltage versus current source signal, and supply voltage versus overcurrent, respectively, for the first implementation of a battery pack system of FIG. 1.
Figure 3B:
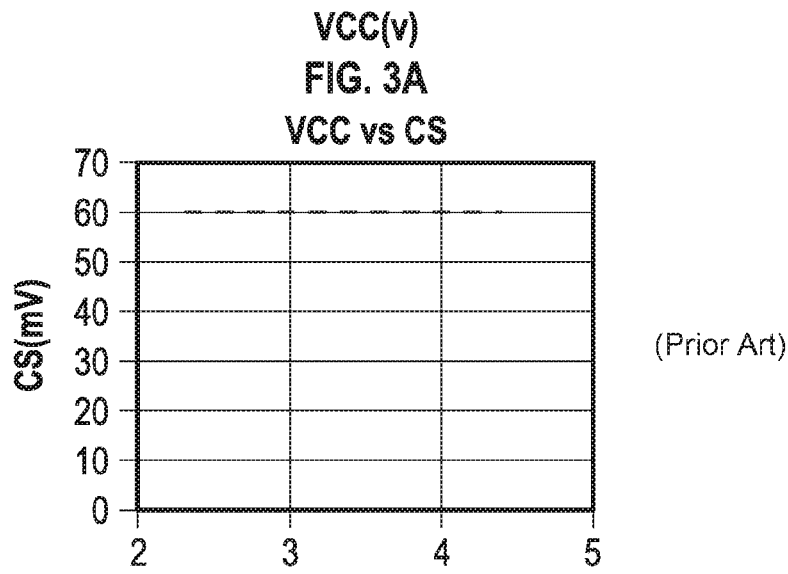
Figure 3C:
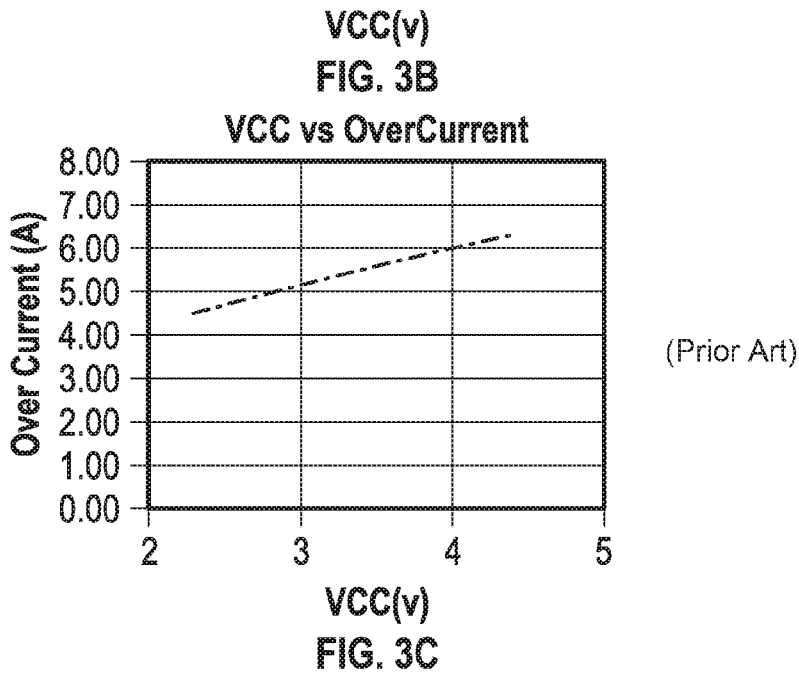

The conventional system 2 to outputs the same reference voltage 10 to the overcurrent detector circuit 8 for detection of overcurrent conditions regardless of the actual supply voltage levels or the temperatures of the system components, particularly the FETs 22, 24. This behavior, if applied across the entire range of possible supply voltage and temperature ranges encountered during operation has undesirable aspects. Referring to FIG. 3A, it can be observed that the on resistance of the FETs 22, 24 which act to allow electrical power to enter and leave the battery 4 varies as a function of the supply voltage provided by the battery 4. As can be observed in FIG. 3C, this variance of the on resistance with the supply voltage results in the overcurrent value becoming a function of the supply voltage as well. This condition is not very desirable, because it means that the ability to detect an overcurrent condition and protect the battery becomes a function of the battery's own variables, such as charging level, supply voltage, temperature, cell health, etc. The likelihood that the battery will be operated under undesirable conditions that could damage the battery or cause a safety issue is higher for conventional systems.

Figure 2:
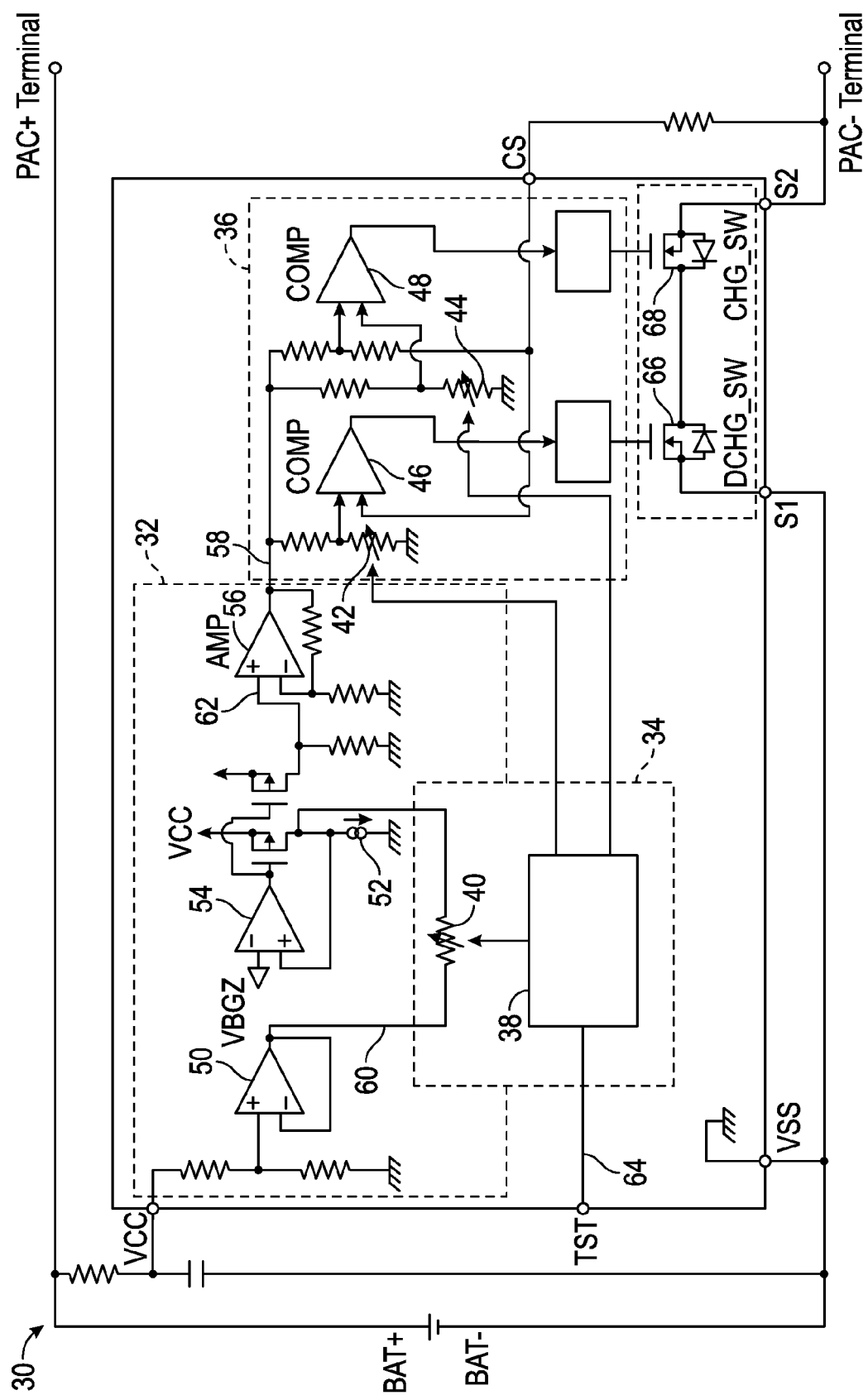
FIG. 2 is a circuit diagram of a second implementation of a battery pack system.

Referring to FIG. 2, a second implementation of a battery pack system 30 is illustrated. As illustrated, the system 30 includes reference voltage circuit 32 coupled with a variable resistor circuit 34 and with an overcurrent detection circuit 36. The variable resistor circuit 34 includes a fuse array 38 which is coupled to a plurality of resistors 40 coupled to the reference voltage circuit 32. Also, as illustrated, various system implementations may also couple the fuse array 38 with variable resistors/plurality of resistors 42, 44 coupled to comparators 46, 48 that are part of the discharge overcurrent and charging overcurrent detectors of the overcurrent detection circuit 36. Each fuse in the fuse array 38 has a certain state (open/closed or left closed) and that state may be set using any of the methods and systems disclosed in copending U.S. patent application Ser. No. 14/809,425, to Saito, et al., entitled "Programmable Battery Protection System and Related Methods" filed Jul. 27, 2015; copending U.S. patent application Ser. No. 14/811,973 to Saito, et al., entitled "Automatically Programmable Battery Protection System and Related Methods," filed Jul. 29, 2015; and copending U.S. patent application Ser. No. 14/813,314, to Amemiya, et al., entitled "Automatically Programmable Battery Protection System and Related Methods," filed Jul. 30, 2015 (the "Fuse-Related Applications"), the disclosures of each of which are hereby incorporated entirely herein by reference. In particular implementations, the fuses may be set using laser trimming using a specified on resistance for the FETs 66, 68 rather than the methods disclosed in the Fuse-Related Applications. The fuses 38 may be polyfuses in particular implementations. The various components of the system that do not include the FETs 66, 68 are included in a battery protection integrated circuit (IC) which is physically separate from the battery itself. In various implementations, the battery protection IC may be included with the FETs in the same semiconductor package.

In various system implementations, the array of fuses 38 are coupled to a plurality of switching components (not shown) that are coupled in parallel with a plurality of resistors 40 that are coupled in series. As described at length in the Fuse-Related Applications, as the switching components are individually opened or closed, a summed resistance of the plurality of resistors 40 changes, which changes the ultimate voltage that remains and current that passes through the plurality of resistors 40. The switching components that are opened or closed depend on the states of the corresponding fuses in the array of fuses 38. A wide variety of switching components may be utilized in various implementations including any disclosed in the Fuse-Related Applications or disclosed in the various references incorporated by reference in this document. As illustrated in FIG. 2, the array of fuses 38 can also include fuses used to set the summed resistance of variable resistors 42, 44. In implementations where the variable resistors 42, 44 also include a plurality of resistors and plurality of switching components, the array of fuses 38 may be coupled to more than one set of a plurality of resistors and more than one set of a plurality of switching components. The same fuse states may be used to set the summed resistance of the plurality of resistors 40 and the variable resistors 42, 44, or the fuse array 38 may include separate portions of fuses which are used to set the summed resistance for each set of plurality of resistors individually, or in any particular combination.

The summed resistance of the plurality of resistors 40 is used to generate a current signal as the supply voltage changes. By using this current signal, a current sense signal of the system can be made to vary substantially linearly with changes in the supply voltage. Also, because changes in the supply voltage can be comprehended, the overcurrent signals (via the reference voltages used) can be made substantially invariant to changes in the supply voltage. Non-limiting examples sufficient to inform those of ordinary skill in the art of substantially linear relationships between current sense and supply voltage (Vcc) and substantially invariant relationships between overcurrent and supply voltage can be found in FIGS. 4A and 4C, respectively.

Referring to FIG. 2, the supply voltage (VCC) is supplied to comparator 50, which is designed to output a voltage when the supply voltage changes and to not output a voltage when the supply voltage remains constant (comparative supply voltage 60) through connecting the output of the comparator 50 to the negative terminal of the comparator 50. The plurality of resistors 40 then create a current in combination with constant current source 52 included in a band gap buffer circuit that includes a comparator 54. Comparator 54 compares a band gap voltage VBGZ with the voltage present in the circuit including the constant current source 52 and outputs a voltage that opens the gates of two transistors to create a differential voltage 62 to be input into amplifier 56. Amplifier 56 then outputs the reference voltage 58 which is then supplied to comparators 46 and 48 for use in detecting overcurrent conditions.

By varying the summed resistance of the plurality of resistors 40, the differential voltage 62 applied to the amplifier 56 can be adjusted. Also, because the current generated using the comparative supply voltage 60 varies depending on changes in the supply voltage, the differential voltage 62 changes as well, which allows the reference voltage 58 to be dynamically/automatically changed during operation as a function of the actual supply voltage. By inspection of the circuit diagram, the CS (current sense) signal is also a function of the reference voltage 58, and will vary as the reference voltage 58 varies. Since the reference voltage 58 is a function of changes in the supply voltage, the current sense signal is now also a function of changes in the supply voltage. By being able to program/set the value of the summed resistance of the plurality of resistors 40 following assembly of the system 30 during initial testing using a testing fuse trimming signal 64, for example, the actual on resistances of the FETs 66, 68 can be calculated. As discussed in the Fuse-Related Applications, the ability to adjust the parameters of the system based on the actual on resistance of the FETs 66, 68 may reduce the variability in the reference voltage 58 and improve protection of the battery and mitigate unsafe operating conditions. Combining this capability with the ability to dynamically adjust the reference voltage 58 based on changes in the supply voltage may further reduce variability in the reference voltage 58 and thereby improve system operation and safety.

Figure 4A:
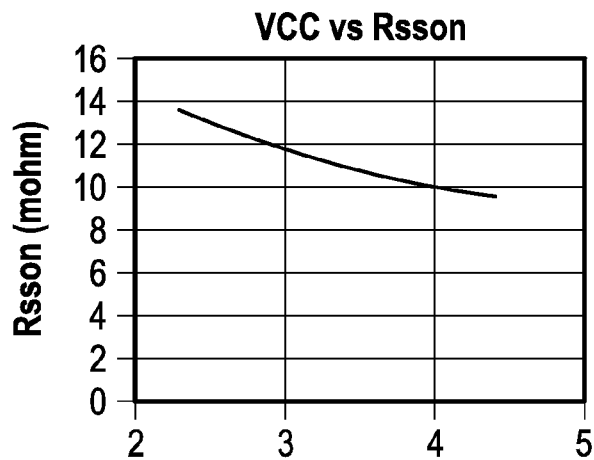
FIGS. 4A-C are diagrams of supply voltage versus on resistance of a field effect transistor (FET), supply voltage versus current source signal, and supply voltage versus overcurrent, respectively, for the second implementation of a battery pack system of FIG. 2.
Figure 4B:
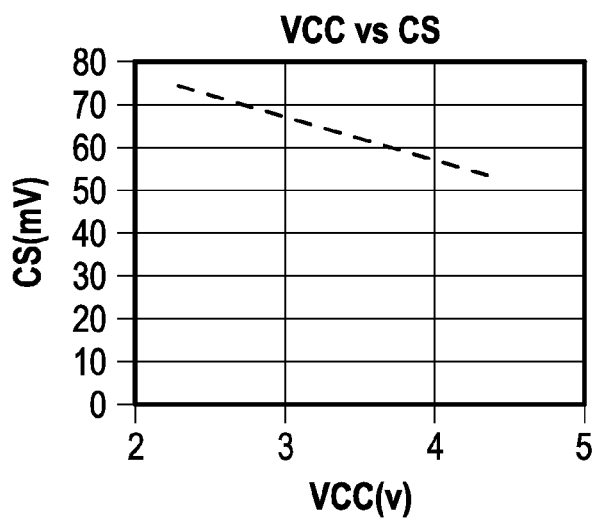
Figure 4C:
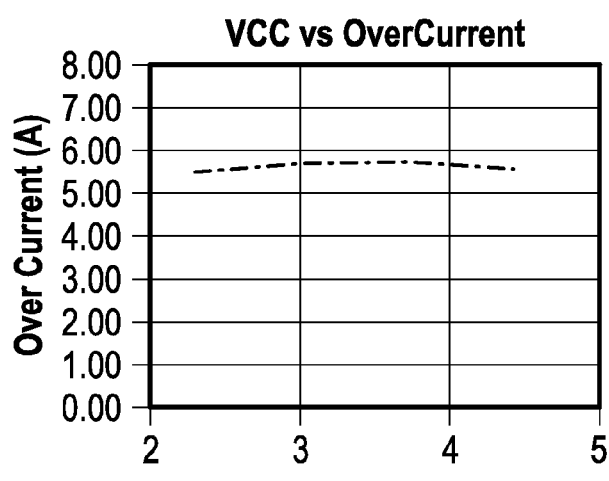

Examples of the operating characteristics of an implementation of a battery pack system like that illustrated in FIG. 2 are illustrated in FIGS. 4A-C. FIG. 4A demonstrates that the on resistance of the FETs is still the same function of the supply voltage as in the implementations illustrated in FIG. 1 and FIG. 3A. FIG. 4B, however, illustrates how the current sense signal is a substantially linear function of the supply voltage. Since the slope of the line is negative, when the supply voltage increase, the current sense signal (and current) goes down; when the supply voltage decreases, the current sense signal (and current) goes up. The effect of this linearization and ability to dynamically adjust the reference voltage 58 during operation to changes in supply voltage can be seen in FIG. 4C, which shows how the overcurrent signal has become substantially invariant to changes in the supply voltage.

Figure 5:
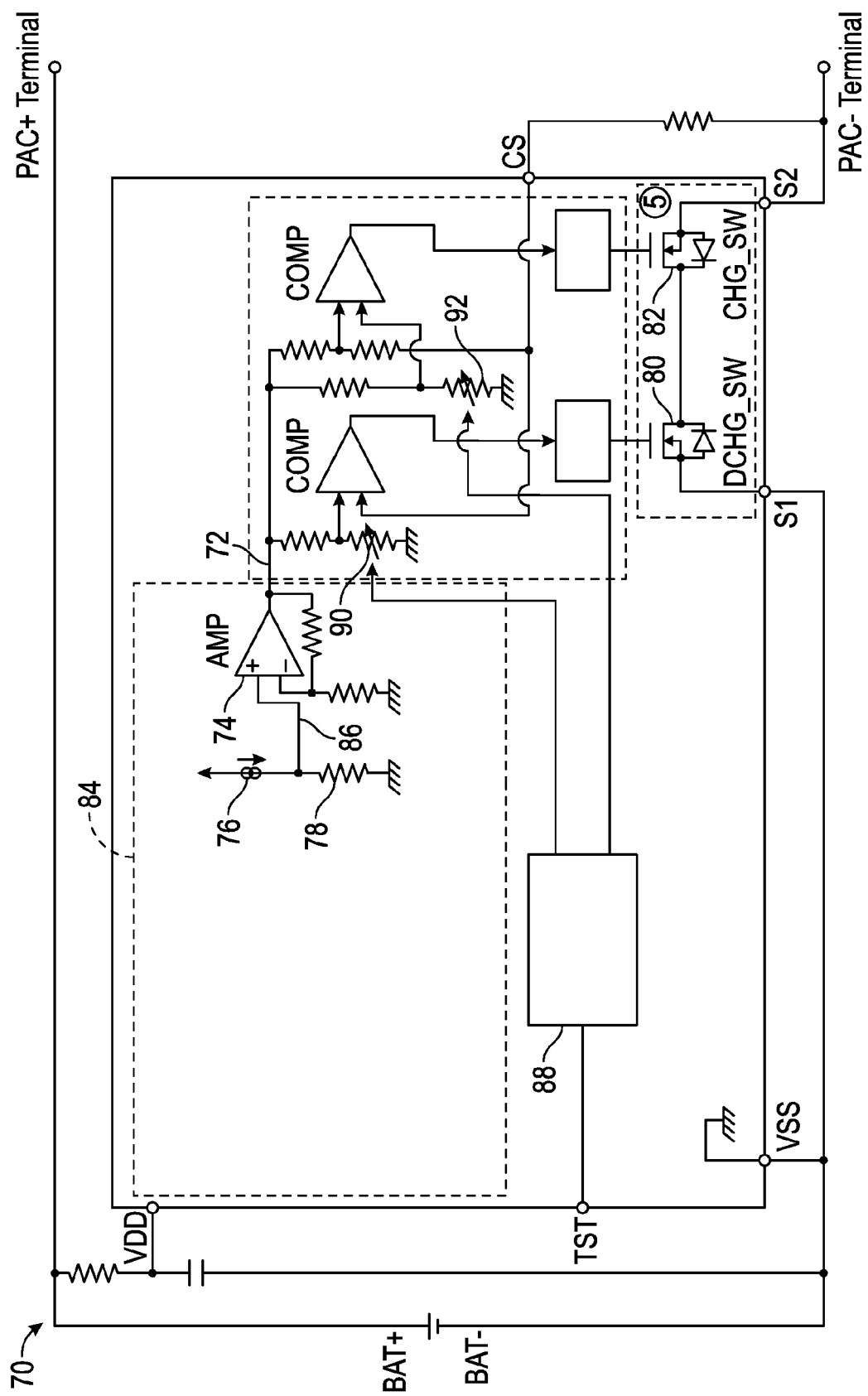
FIG. 5 is a circuit diagram of a third implementation of a battery pack system.

Referring to FIG. 5, a third implementation of a battery pack system 70 is illustrated. As illustrated, the reference voltage 72 of the system 70 is generated by a temperature variation correction circuit 84. The circuit 84 includes an amplifier 74 which receives an input voltage 86 from a constant current source 76 coupled to ground through a diffused resistor 78. The resistance of diffused resistor 78 is a function of the temperature of the resistor 78, because the impedance of the resistor 78 changes with temperature. Because of this, as the temperature of the diffused resistor 78 changes, the input voltage 86 to the amplifier 74 also changes. Examples of diffused resistors that may be used in various implementations may be found in the paper by Chuang et al., entitled "Temperature-dependent Characteristics of Polysilicon and Diffused Resistors," *IEEE Transactions on Electron Devices*, V. 50, No. 5, p. 1413-1415 (May 2003), the disclosure of which is incorporated entirely herein by reference.

Since the temperature of the resistor 78 is likely to be very close to the temperature of the battery protection IC, and where the FETs 80, 82 and the battery protection IC are included in the same package (as they are in various implementations), the temperature of the resistor 78 is also likely to be very close to the temperature of the FETs 80, 82. This is significant, because the on resistance of the FETs 80, 82 is a function of their temperature. Accordingly, being able to use the temperature of the diffused resistor 78 as an input to the reference voltage circuit 84 generating the reference voltage 72 provides a way to change the reference voltage 72 as a function of the temperature dependence of the on resistance of one or both FETs 80, 82.

As illustrated, an array of fuses 88 may be used to set the resistance of variable resistors 90, 92 as previously disclosed herein. In such implementations, the use of a reference voltage circuit 32 like those disclosed herein may not be used. In other implementations, a reference voltage circuit 32 like those disclosed herein may be used in combination with the temperature variation correction circuit 84. In such implementations, the effects of variation of the on resistance of the FETs with both supply voltage and temperature may be able to be dynamically controlled and reflected in the threshold voltage supplied to the overcurrent detection circuit. In other implementations, either circuit 32, 84 could be used independently to control supply voltage effects or temperature effects as desired.

Figure 6A:
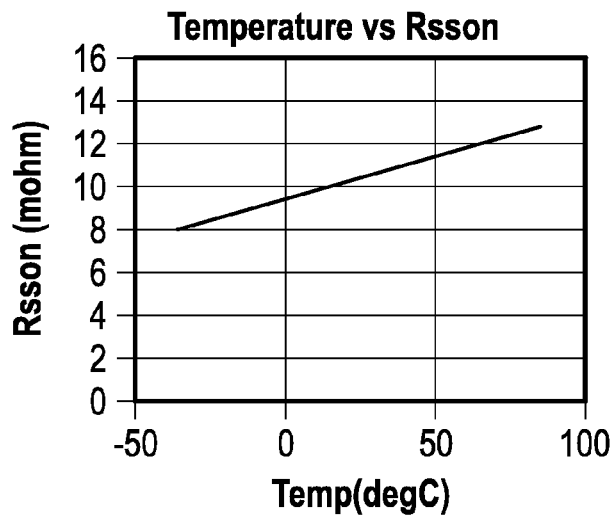
FIGS. 6A-C are diagrams of temperature versus on resistance of a field effect transistor (FET), temperature versus current source signal, and temperature versus overcurrent, respectively, for the first implementation of a battery pack system of FIG. 1.
Figure 6B:
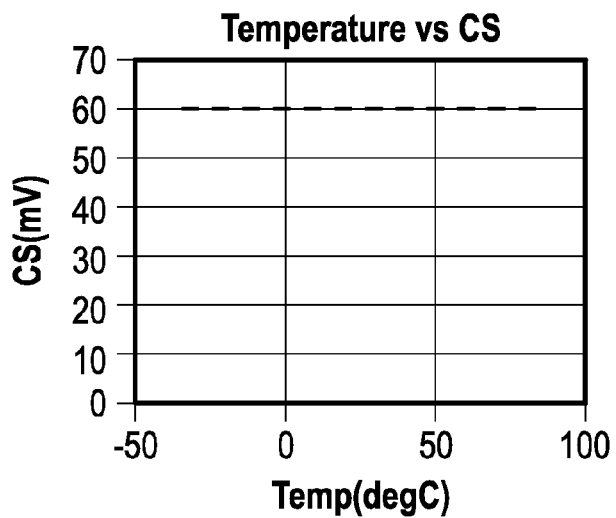
Figure 6C:
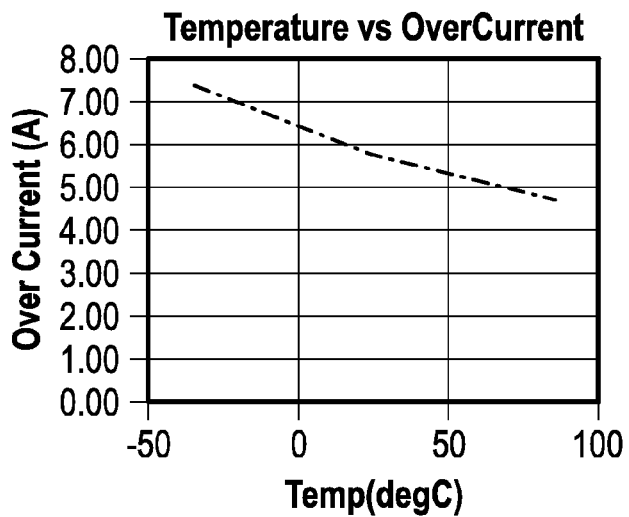
Figure 7A:
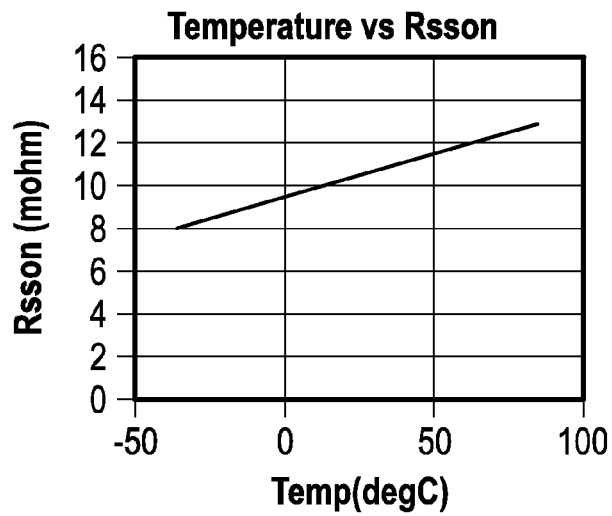
FIGS. 7A-C are diagrams of temperature versus on resistance of a field effect transistor (FET), temperature versus current source signal, and temperature versus overcurrent, respectively, for the third implementation of a battery pack system of FIG. 5.
Figure 7B:
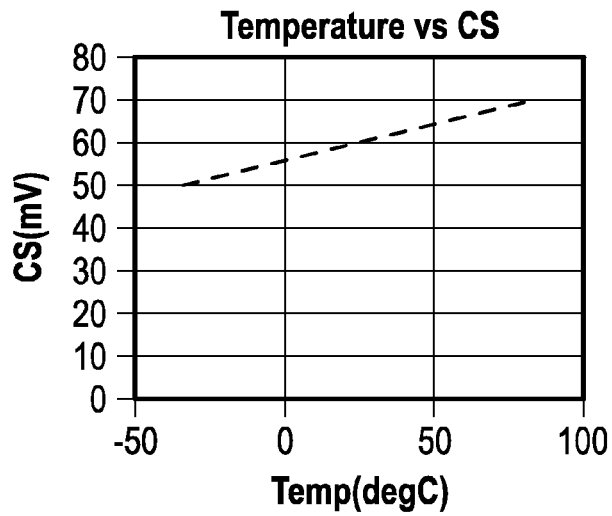
Figure 7C:
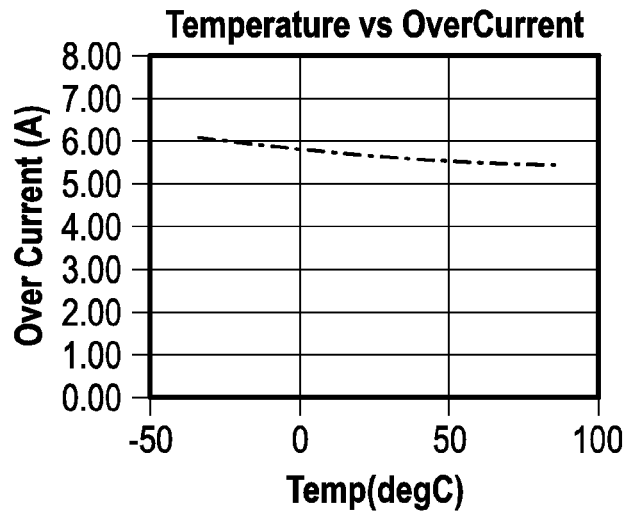

Referring to FIGS. 6A-C and 7A-C, the characteristics of the system 2 implementation illustrated in FIG. 1 and the characteristics of the system 70 illustrated in FIG. 5 are illustrated, respectively. FIG. 6A shows how the on resistance (Rsson) of the FETs 22, 24 varies as a function of the temperature of the FETs. Since the FETs 80, 82 in the system of 70 are the same, they show the same temperature behavior as illustrated in FIG. 7A. By inspection, it is evident that there is no correlation between the current sense signal and the temperature of the FETs for the system 2. However (see FIG. 7B), through the use of the temperature variation correction circuit 84, the current sense signal varies substantially linearly with changes in temperature of the FETs 80, 82 (since the diffused resistor 78 is close to the FETs 80, 82, it is accurate to say the variation is with respect to the temperature of the diffused resistor 78 as well). Since the slope of the line in FIG. 7B is positive, increases in temperature increase the current sense signal and vice versa. The change in current sense signal reflects the change in impedance in the diffused resistor 78 as the temperature rises, increasing the impedance. The reference voltage 72 likewise changes with the impedance of the diffused resistor 78, increasing as the impedance increases.

Using the various reference voltages disclosed herein, the various overcurrent detection circuits disclosed herein determine whether a discharge overcurrent condition and/or charging overcurrent condition exists with respect to the battery being connected to a load or to a charger, respectively. If either or both conditions are detected, the overcurrent detection circuits are configured to disconnect the battery pack system from the load or charger to prevent damage to the battery and/or the load or charger.

In places where the description above refers to particular implementations of battery protection systems and implementing components, sub-components, methods and sub-methods, it should be readily apparent that a number of modifications may be made without departing from the spirit thereof and that these implementations, implementing components, sub-components, methods and sub-methods may be applied to other battery protection systems.

What is claimed is:

1. A programmable battery protection system comprising:
   a battery; and
   a battery protection integrated circuit (IC) coupled with the battery comprising:
   a reference voltage circuit;
   a variable resistor circuit coupled with the reference voltage circuit; and
   an overcurrent detection circuit coupled with the reference voltage circuit; and
   only two field effect transistors (FETs) coupled with the overcurrent detection circuit and with the battery;
   wherein the reference voltage circuit and variable resistor circuit are configured to cause a current sense signal of the system to vary substantially linearly with changes in a supply voltage of the system.

2. The system of claim 1, wherein the reference voltage circuit and variable resistor circuit are configured to cause an overcurrent signal of the system to be substantially invariant to changes in a supply voltage of the system.

3. The system of claim 1, wherein the reference voltage circuit comprises a supply voltage detector circuit, a bandgap buffer circuit, and an amplifier operatively coupled together.

4. The system of claim 1, wherein the variable resistor circuit comprises an array of fuses coupled with one or more sets of a plurality of switching components coupled in parallel with one or more sets of a plurality of resistors wherein the states of the array of fuses are configured to open or close corresponding switching components of the one or more sets of the plurality of switching components, permitting one or more summed resistances generated by the one or more sets of the plurality of resistors to be changed.

5. The system of claim 1, wherein the overcurrent detector circuit is configured to use a reference voltage generated by the reference voltage circuit to evaluate whether one of a discharge overcurrent condition and charging overcurrent condition exist and to, in response to detecting the one of the discharge overcurrent condition and the charging overcurrent condition, disconnect the only two FETs from the battery.

6. The system of claim 1, wherein the only two FETs and the battery protection IC are comprised in the same semiconductor package.

7. The system of claim 4, wherein the states of the array of fuses are configured to be set using a trimming signal generated during an initial testing of the on resistance of the only two FETs.

8. The system of claim 4, wherein the array of fuses comprise polyfuses.

9. The system of claim 4, wherein the states of the array of fuses are configured to be set using a laser trimming signal based on a specified on resistance of the only two FETs.

10. The system of claim 4, wherein the overcurrent detector circuit is configured to use a reference voltage generated by the reference voltage circuit and the one or more summed resistances to evaluate whether one of a discharge overcurrent condition and a charging overcurrent condition exist and to, in response to detecting the one of the discharge overcurrent condition and the charging overcurrent condition, disconnect the only two FETs from the battery.

11. The system of claim 1, wherein the battery protection IC further comprises a temperature variation correction circuit comprising a diffused resistor coupled to a constant current source and the amplifier, wherein the diffused resistor is configured to change the reference voltage output from the amplifier as a resistance of the diffused resistor changes as a function of the temperature of the diffused resistor.

12. The system of claim 11, wherein the temperature variation correction circuit is configured to cause the current sense signal of the system to vary substantially linearly with changes in temperature of the diffused resistor.

13. A battery protection integrated circuit (IC) for a battery protection system, the circuit comprising:
a reference voltage circuit comprising a supply voltage detector circuit, a bandgap buffer circuit, and an amplifier, the reference voltage circuit configured to supply a reference voltage that is a function of a supply voltage;
a variable resistor circuit coupled with the reference voltage circuit, the variable resistor circuit comprising an array of fuses coupled with one or more sets of a plurality of switching components coupled in parallel with one or more sets of a plurality of resistors wherein the states of the array of fuses are configured to open or close corresponding switching components of the one or more sets of the plurality of switching components, permitting one or more summed resistances generated by the one or more sets of the plurality of resistors to be changed; and
an overcurrent detection circuit coupled with the reference voltage circuit;
wherein the overcurrent detector circuit is configured to use the reference voltage generated by the reference voltage circuit and the one or more summed resistances to evaluate whether one of a discharge overcurrent condition and charging overcurrent condition exist and to, in response to detecting the one of the discharge overcurrent condition and the charging overcurrent condition, disconnect a battery from one of a load and a charger.

14. The IC of claim 13, further comprising a temperature variation correction circuit comprising a diffused resistor coupled to a constant current source and the amplifier, wherein the diffused resistor is configured to change the reference voltage output from the amplifier as a resistance of the diffused resistor changes as a function of the temperature of the diffused resistor.

15. A method of providing a reference voltage to an overcurrent detection circuit of a battery protection integrated circuit (IC), the method comprising:
substantially linearizing a response of a current sense signal of a battery to changes in a supply voltage of the battery by:
using a plurality of states stored in an array of fuses, setting a summed resistance of a plurality of resistors coupled to a plurality of switching components coupled with the array of fuses;
using the summed resistance and a supply voltage detector comparator, generating a current by converting variation in the supply voltage into a current; and
using the current and a bandgap buffer circuit and an amplifier, generating a reference voltage for use by an overcurrent detector circuit.

16. The method of claim 15, wherein the current increases when the supply voltage decreases and the current decreases when the supply voltage increases.

17. The method of claim 15, further comprising using the overcurrent detector circuit and the reference voltage to evaluate whether one of a discharge overcurrent condition and a charging overcurrent condition exist and to, in response to detecting the one of the discharge overcurrent condition and the charging overcurrent condition, disconnect the battery from one of a load and a charger.

18. The method of claim 15, using a temperature variation correction circuit to substantially linearize the response of the current sense signal of the battery to changes in temperature.

19. The method of claim 18, wherein the temperature variation correction circuit comprises a diffused resistor coupled to a constant current source and the amplifier, and wherein the method further comprises changing the reference voltage output from the amplifier as a resistance of the diffused resistor changes where the resistance of the diffused resistor is a function of the temperature of the diffused resistor.

20. The method of claim 19, wherein the reference voltage rises as the temperature rises as a function of the impedance of the diffused resistor.

* * * * *

UNITED STATES PATENT AND TRADEMARK OFFICE
CERTIFICATE OF CORRECTION

PATENT NO. : 9,906,015 B2
APPLICATION NO. : 14/814305
DATED : February 27, 2018
INVENTOR(S) : Yasuaki Hayashi et al.

It is certified that error appears in the above-identified patent and that said Letters Patent is hereby corrected as shown below:

In the Claims

Claim 18, Column 10, Line 41, after 'claim 15,' insert --further comprising--

Signed and Sealed this
Twenty-seventh Day of March, 2018

Andrei Iancu
*Director of the United States Patent and Trademark Office*